No. 743,428. PATENTED NOV. 10, 1903.
H. C. BECKMAN.
CENTRIFUGAL SEPARATOR.
APPLICATION FILED MAY 24, 1902.
NO MODEL. 2 SHEETS—SHEET 2.
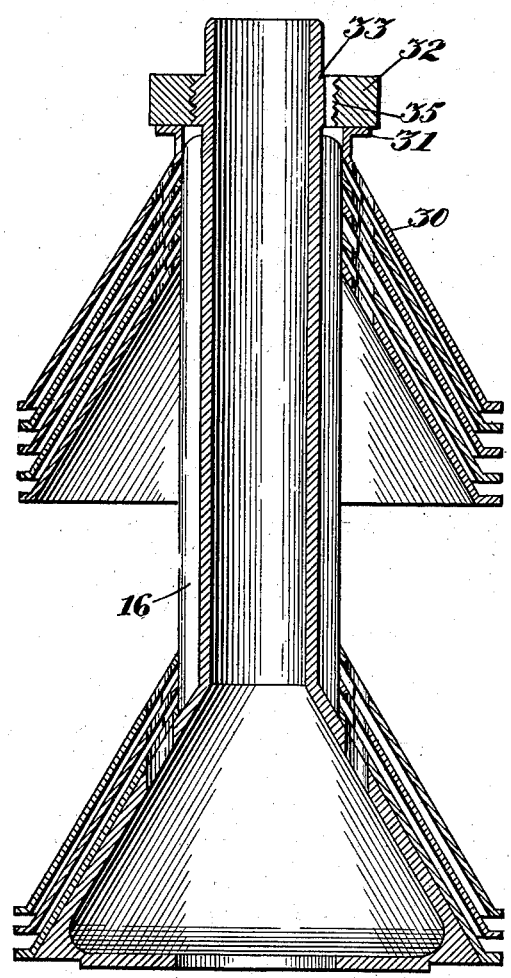
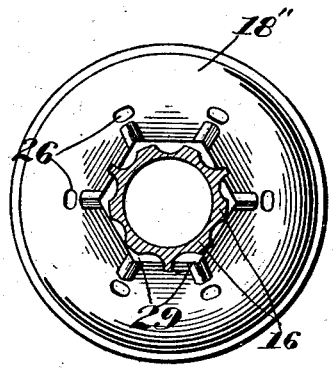
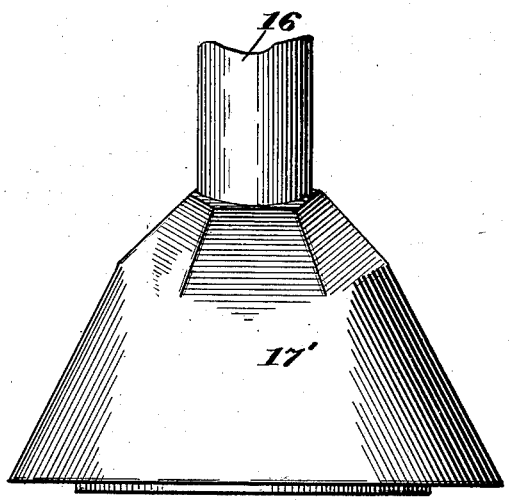
Witnesses:
Inventor:
Herman C. Beckman.

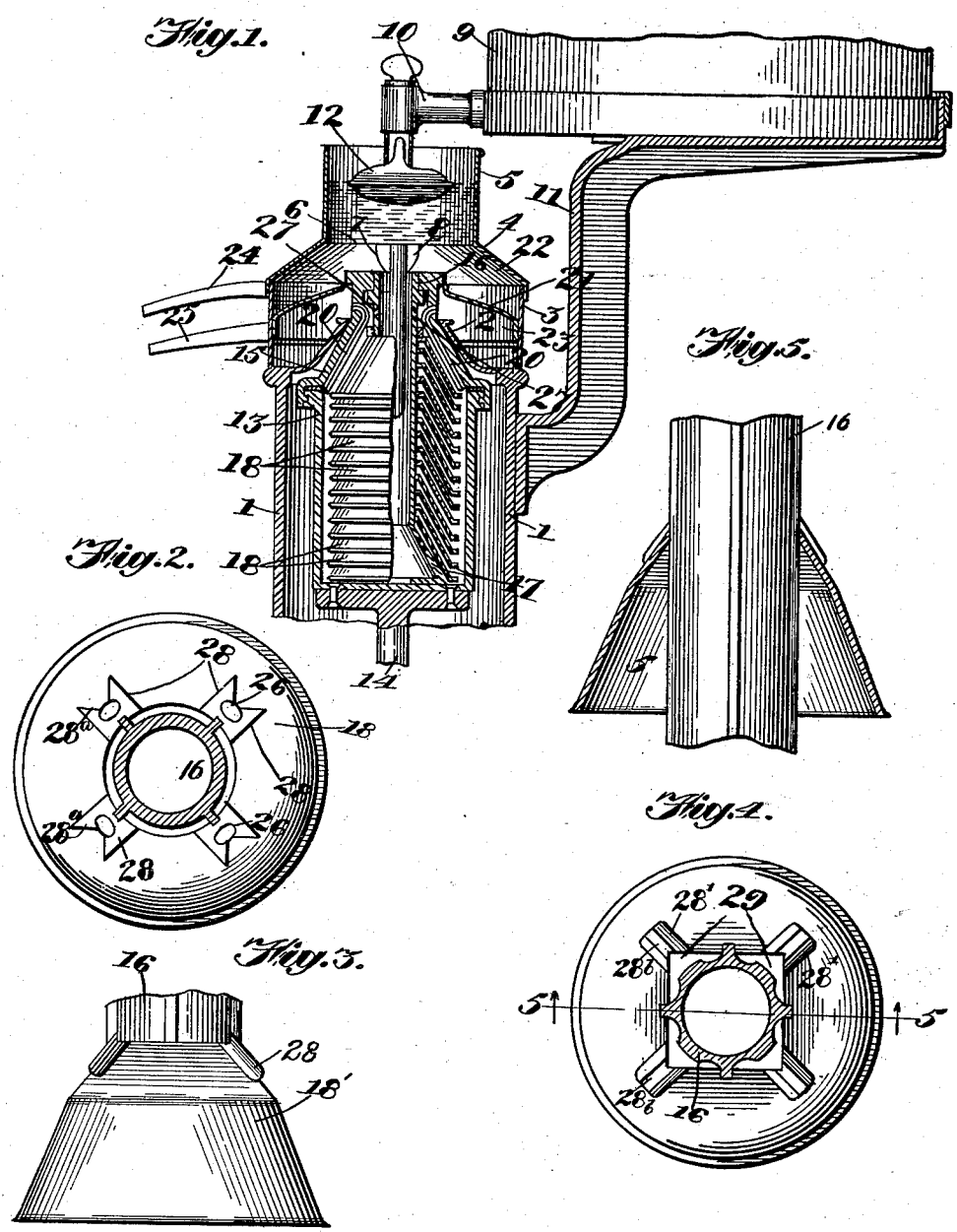

No. 743,428.　　　　　　　　　　　　　　　　　　　　　Patented November 10, 1903.

UNITED STATES PATENT OFFICE.

HERMAN C. BECKMAN, OF CHICAGO, ILLINOIS, ASSIGNOR TO THE DE LAVAL SEPARATOR CO., OF NEW YORK, N. Y., A CORPORATION OF NEW JERSEY.

CENTRIFUGAL SEPARATOR.

SPECIFICATION forming part of Letters Patent No. 743,428, dated November 10, 1903.

Application filed May 24, 1902. Serial No. 108,822. (No model.)

*To all whom it may concern:*

Be it known that I, HERMAN C. BECKMAN, a citizen of the United States, residing at Chicago, in the county of Cook and State of Illinois, have invented a certain new and useful Improvement in Centrifugal Separators, (Case No. 1,) of which the following is a full, clear, concise, and exact description, reference being had to the accompanying drawings, forming a part of this specification.

My invention relates to centrifugal separators for separating the constituent elements of heterogeneous bodies from one another; and it relates in particular to a form of separator adapted for use for liquids and used especially for separating the cream from full milk involving a rotary bowl containing a series of conical or beveled division rings or disks by which the liquid within the bowl is separated into layers or strata to render the separating action more efficient, as is well known in the art.

The object of my invention is to facilitate the separating action and the return-flow of the liquids after separation.

In the separator herein set forth for carrying out my invention I provide the rotary division rings or disks forming a part of the rotary member in the separating-bowl with apertures near their upper or central portions, so that these apertures in the series of disks or rings form an outlet-channel for full milk. I also make the disks or rings with the upper or central portions pyramidal in form. By so doing the full milk and cream in flowing along the disks or rings are separated from one another, the full milk working out along the corners of the pyramidal portion of the disk and the cream being forced between the corners so as to flow along the sides thereof. Another advantage that results from this arrangement is that the upper or central portion of each disk is inclined more, so that it is nearer a perpendicular to the axis of rotation, while the lower or marginal portion of the disk is not changed. In this way the separation is accomplished with the maximum efficiency by the lower or marginal portion of the disk, while the flow of the skimmed milk and cream at the central portion of the disk is facilitated because of the nearer approach of such portion to the horizontal. I also provide each disk with lugs or similar devices arranged radially near the central portion of the disk. These lugs form passage-ways at the central portions of the disk, and thereby induce a more rapid and full flow of the cream, and thereby prevent clogging.

In the accompanying drawings, Figure 1 is a view of a portion of a centrifugal separator embodying my present invention. Fig. 2 is a horizontal sectional view showing the bowl, the milk-tube, and one of the disks. Figs. 3, 4, and 5 are views showing a portion of the milk-tube and a modified form of disk, Fig. 5 being a vertical section taken on line 5 5 in Fig. 4. Fig. 6 is a view of the rotary member, showing the manner of holding the disks in position. Fig. 7 is a horizontal sectional view showing a still further modified form of disk, and Fig. 8 is a view of the bottom of a milk-tube adapted to accommodate disks of the kind shown in Fig. 7.

In Fig. 1 I have shown a centrifugal separator embodying the general features of construction of a well-known form of centrifugal separator now in use. This comprises an annular casing 1, having an open conical top portion 2. Above the casing 1 is an annular casing 3, having a top 4, whose upper portion 5 forms a reservoir for the full milk which is to be treated. The top 4 has a horizontal partition 6, having a central opening 7, containing a tube 8, by which the full milk can flow downwardly from the receptacle 5. A reservoir 9, having an outlet 10, is shown supported by an arm 11, secured to the casing 1 in such position that the outlet 10 is over the receptacle 5. A float-valve 12 is arranged in the receptacle 5, so as to automatically control the inflow of the full milk. Within the casing 1 is arranged a rotary bowl 13, supported on and secured to a rotary shaft 14. The bowl 13 has a conical top 15, whose upper end is open and fits closely within the upper end of the conical top of the casing 1. The bowl 13 contains a central milk-tube 16, having a flaring end 17. The upper end of the tube 16 fits closely within the upper end of the top 15 of the bowl and receives the inlet pipe or tube 8. A series of conical or beveled disks 18 18 are carried by the tube 16, the disks having central apertures, through which the tube passes. The disks are arranged a slight distance apart above one another, as well shown in Fig. 1. Tubes 20 20 are arranged inside of the top 15 of the bowl 13, with their lower ends near the wall of the bowl and their upper ends opening out the side of the top 15 above the conical top 2 of the casing 1. These are the outlets for the skimmed milk. The annular casing 3 is provided with a partition 21, dividing it into upper and lower chambers 22 and 23, whereof the chamber 22 becomes a cream-chamber and the chamber 23 a skimmed-milk chamber. Spouts or outlets 24 25 are extended from these chambers. In this form of centrifugal separator, as is well known, the separation of the cream and skimmed milk is effected by the rapid rotation of the bowl 13. The full milk feeds into the tube 16 by way of the tube or pipe 8 and passes out through the funnel-shaped end 17 of such tube 16 and then rises, so as to be acted upon by the disks 18 18. The disks divide the full milk into layers or strata, and their rapid rotation causes separation to take place in such layers or strata, the skimmed milk, which is heavier, being thrown outwardly to the walls of the bowl 13 and the cream being forced inwardly toward the center or axis of rotation, the skimmed milk passing out along the inner surfaces of the disks and the cream passing in along the outer sides thereof. The skimmed milk rises and passes out of the bowl by way of the tubes 20 20 into the chamber 23 and thence out the outlet 25. The cream rises at or near the center of the bowl 13 and passes into the chamber 22 and thence out the outlet 24.

In accordance with my invention I provide the disks 18 18 with apertures at or near their central portions for the full milk. In Fig. 2 I have shown a disk provided with a series of apertures 26 26, formed near the central aperture for the core. These apertures allow the full milk to rise from disk to disk after it has passed out into the bowl through the apertures in the flaring end 17 of the tube 16. In Fig. 1 the apertures are shown on the right-hand side of the disks, one above the other, whereby a continuous passage is offered for the full milk. Provision is made for the passage of the cream into the tube 16, a simple way being to provide the tube with apertures 27 27 near its upper end. I furthermore desirably provide each disk with lugs 28 28, Fig. 2, arranged at intervals from one another near the central portion of the disk. These lugs serve to close a portion of the passage-way for the cream, and thereby, in effect, form a contracted passage, which produces a more rapid flow of the cream, and thereby prevents clogging. These lugs are placed at or near the apertures 26 26 and made with flaring openings 28$^a$, whereby the full milk is allowed to escape and the cream is kept away to prevent interference of the two streams.

In Figs. 3, 4, and 5 I have shown a modified form of disk 18', whose upper or central portion is made in a square pyramidal form. In such case the apertures for the full milk are formed by the spaces 29 29 between the corners of the pyramidal portion and the core 16, and lugs 28' 28' are secured at the corners and provided with slots 28$^b$ 28$^b$ for the full milk. This arrangement allows the full milk to pass out by way of the corners of the pyramidal portion and the cream to collect and pass in on the sides between the corners, whereby interference between the two streams is avoided. It also facilitates the flow of the cream at the central portion of the disk, because at such portion the sides of the pyramidal portion where the cream collects are more nearly horizontal, or, in other words, more nearly perpendicular to the axis of rotation. This is well shown in Figs. 3 and 5, where the difference in inclination is slightly exaggerated for the purposes of illustration. It is desirable to make the lower portion of the disk in the usual manner—that is, with an inclination of about sixty degrees, which is found to be the most effective angle for separation purposes—and then to make the upper portion at a less angle to the horizontal, by which arrangement the most effective separation is secured and at the same time the inflow of the cream is greatly facilitated.

In Fig. 7 I have shown a disk 18" having its central portion made in a hexagonal pyramidal form. This has the same general features of construction and general advantages of the disk with the square pyramidal top shown in Figs. 3, 4, and 5. I have shown this disk provided with apertures 26 26, as in the case of the disks shown in Figs. 1 and 2, although it is not necessary to have such apertures, the spaces 29 29 being able to allow the cream to flow out, as in the case of the square-top disk.

In Fig. 8 I have shown a milk-tube having a flaring bottom 17', with its top or central portion made hexagonal to correspond to the disk 18".

In Fig. 6 I have shown the manner of holding the disks in position upon the milk-tube. In this arrangement I provide an upper shell 30, having a flange 31 and a nut 32, and I form a thread on an enlarged portion 33 of the tube, whereby the nut 33 can be adjusted to hold the shell 30 securely upon the disks, it being understood that the shell 30 has substantially the contour of the disks and heavier than the same. This allows adjustment to take up loosening occasioned by wear and tear on the machine and still hold the disks tight. The threaded portion 33 is cut away at 35 to form an outlet for the cream, which, it is understood, passes up along the core, between the same and the edges of the central apertures of the disks.

It will be observed that in the apparatus herein set forth the milk-tube 16 is closed—that is to say, it has no side openings out of which the full milk can pass—in contradistinction to apparatus having long side openings or slots. This makes the difference in the action of the apparatus that the full milk in the apparatus herein set forth descends through the tube to the bottom thereof and thence upwardly from disk to disk through the apertures therein, whereas in the other apparatus with longitudinal slots in the tube the full milk passes out of the tube by way of such slots into the spaces between the disks. In the claims I use the term "closed" in this sense—that is, meaning having closed sides instead of slotted sides.

It will be understood that I do not wish to limit myself to the exact construction herein shown and described, as it is obvious that changes and modifications may be made without departing from the spirit of my invention.

What I claim is—

1. In a centrifugal separator, the combination with the revolving bowl, of a closed milk-tube therein, and conically-shaped disks carried by said tube, said disks having parts of the inner portions of their conical walls cut away to form apertures for the full milk, whereby milk passes down the tube and then upward from disk to disk through apertures therein, as set forth.

2. In a centrifugal separator, the combination with the revolving bowl, of a milk-tube therein, and a series of disks having the inner portions of their separating-surfaces made pyramidal and the outer portions made conical, substantially as set forth.

3. In a centrifugal separator, the combination of a revolving bowl, a milk-tube therein, a series of disks carried by said tube, and lugs arranged between the disks at substantially the inner ends of the cream-passages, so as to thereby contract the inner end portions of the cream-passages, substantially as set forth.

4. In a centrifugal separator, the combination with the revolving bowl, of a central milk-tube therein, a series of disks carried by said tube, and means for contracting the inner end portions of the cream-passages formed between said disks, substantially as set forth.

5. A substantially conical disk for centrifugal separators, having a part of the inner portion of the conical wall cut away so as to form an aperture for the full milk, substantially as set forth.

6. A conically-shaped disk for centrifugal separators, having the inner portion of its separating-surface made pyramidal and the outer portion made conical, substantially as described.

7. A conically-shaped disk for centrifugal separators, provided with lugs 28, 28, located at the inner edge of the separating-surface of the disk, substantially as described.

8. In a centrifugal separator, the combination of a rotary bowl, a central milk-tube therein having a flaring end provided with apertures and made with a pyramidal central portion, a series of disks arranged upon the milk-tube and having the inner portions of their separating-surfaces made pyramidal to correspond substantially with the pyramidal central portion of the flaring end of the milk-tube, lugs on the disks at substantially the inner edges thereof for reducing the space for the passage of the cream, and adjustable means for holding the disks in position, substantially as described.

9. A conically-shaped disk having parts of the central portion of its conical wall cut away to form apertures for the full milk, and lugs on said disks projecting into the cream-space between said apertures, substantially as set forth.

10. A conically-shaped disk for centrifugal separators, having parts of the inner portion of its conical wall cut away to form apertures for the full milk, and lugs secured to said disks and located near the apertures, each of said lugs having a portion located at the side of the aperture to which it is adjacent, whereby it contracts the cream-space between the apertures, substantially as described.

11. A conically-shaped disk for centrifugal separators, having parts of the inner portion of its conically-shaped wall cut away to form apertures for the passage of the full milk, lugs secured to said disk and located near said apertures, each of said lugs having portions on each side of the aperture to which it is adjacent, whereby the cream-space between the apertures is contracted, substantially as described.

12. A conically-shaped disk for centrifugal separators, having parts of the inner portion of its conically-shaped wall cut away to form apertures for the full milk, and lugs secured to said disk near said apertures, said lugs having portions on opposite sides of the apertures to which they are respectively adjacent so as to contract the cream-passages between the apertures, and also having cut-away portions forming passages from said apertures for the full milk, substantially as described.

13. A conically-shaped disk having apertures 26, 26, cut in its conical wall so as to form outlets for the full milk, and lugs 28, 28, secured to said disk near said apertures, said lugs having openings corresponding to the apertures 26, 26, and having flaring cut-away portions 28" forming passages from the apertures 26, 26, for the full milk.

In witness whereof I hereunto subscribe my name this 21st day of May, A. D. 1902.

HERMAN C. BECKMAN.

Witnesses:
I. C. LEE,
O. M. WERMICH.